United States Patent Office 2,783,238
Patented Feb. 26, 1957

2,783,238

5-ACYLIMINO-4-MONONUCLEAR-ARYL-SUBSTITUTED-$\Delta^2$-1,3,4 - THIADIAZOLINE-2-SULFIDES AND METHOD OF PREPARING THE SAME

Richard W. Young, Riverside, Kathryn H. Wood, Greenwich, and Melinda J. Muller, Stamford, Conn., assignors to American Cyanamid Company, New York, N. Y., a corporation of Maine No Drawing. Application January 23, 1956,
Serial No. 560,865

11 Claims. (Cl. 260—306.8)

This invention relates to new organic compounds and more particularly is concerned with the preparation of novel 5 - acylimino - 4 - mononuclear - aryl - substituted-$\Delta^2$-1,3,4 - thiadiazoline - 2 - sulfides of the formula:

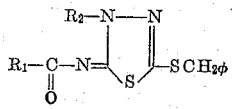

wherein $R_1$ is a hydrogen atom, a lower alkyl radical or a monocyclic aralkyl radical, and $R_2$ is a monocyclic aryl radical. Suitable lower alkyl substituents are methyl, ethyl, propyl, isopropyl, butyl, pentyl, amyl, hexyl, etc.; suitable aralkyl substituents are benzyl, phenethyl, phenylpropyl, phenylbutyl, etc.; and suitable aryl substituents are exemplified by phenyl and substituted phenyl, suitable substituents on the phenyl ring being —Cl, —Br, —I, —NO₂, and lower alkyl radicals containing from 1 to 4 carbon atoms.

The compounds of the present invention find utility as intermediates for the preparation of novel 5 - acylimino-4-mononuclear-aryl - substituted - $\Delta^2$ - 1,3,4 - thiadiazoline-2-sulfonamides which are more particularly described and claimed in the copending application of Richard W. Young and Melinda J. Muller, Serial No. 560,866, filed concurrently herewith. The compounds of the aforesaid copending application are effective natriuretic agents, that is agents which enhance the excretion of sodium in the urine without necessarily changing the normal volume of urine excreted.

As described more in detail in the aforesaid application, the novel thiadiazoline sulfides of this invention can be smoothly converted and in good yield to the corresponding sulfonylchloride derivatives which are then amidated by reaction with liquid ammonia to form the final compounds, namely, the 5 - acylimino - 4 - mononuclear - aryl - substituted - $\Delta^2$ - 1,3,4 - thiadiazoline-2-sulfonamides.

The thiadiazoline sulfides of this invention are preferably prepared by reacting an acyl isothiocyanate, such as acetylisothiocyanate, with a suitable 3 - mononuclear-aryl - substituted - dithiocarbazate, such as 3 - phenylbenzyldithiocarbazate, in the presence of a suitable non-hydroxylated organic solvent, such as toluene or dimethylformamide, by heating to reflux temperatures, that is temperatures of the order of 25° C. to 150° C., maintaining the heating until the evolution of hydrogen sulfide nearly ceases and thereafter removing the solvent by distillation. The thiadiazoline sulfide may then be recovered and purified by recrystallization in a standard manner.

A variety of - 3 mononuclear - aryl - substituted-dithiocarbazates may be used in carrying out this invention such as, for example, 3 - phenylbenzyldithiocarbazate, 3-m - tolyl)benzyldithiocarbazate, 3 - (p - bromophenyl)-benzyldithiocarbazate, 3 - (p-chlorophenyl)benzyldithiocarbazate, 3 - (p-iodophenyl)benzyldithiocarbazate, 3-(p-acetamidophenyl)benzyldithiocarbazate, 3 - (m-methoxyphenyl)benzyldithiocarbazate, 3 - (3,4 - dichlorophenyl)-benzyldithiocarbazate, and 3-(p-isopropylphenyl)-benzyldithiocarbazate.

The isothiocyanates used in this reaction may be any suitable acyl isothiocyanate such as acetylisothiocyanate, propionylisothiocyanate, trimethylacetylisothiocyanate, benzoylisothiocyanate, etc.

The preparative method for the compounds of this invention is illustrated schematically below using acetylisothiocyanate as an example of a suitable acyl isothiocyanate and 3-phenylbenzyldithiocyanate as an example of a suitable 3-substituted dithiocarbazate.

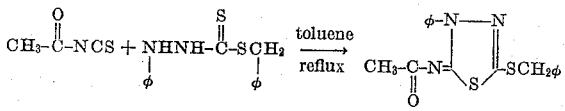

The invention will be described in greater detail in conjunction with the following specific examples in which the parts are by weight unless otherwise specified.

EXAMPLE 1

*5-acetylimino-4-phenyl-2-benzylmercapto-$\Delta^2$-1,3,4-thiadiazoline*

To a solution of 75 parts by volume of toluene and 7.4 parts of acetylisothiocyanate (J. Chem. Soc., 89, 564) there was added 20 parts of 3-phenylbenzyldithiocarbazate (J. Prakt. Chem., [2], 60, 218). After several minutes of heating at reflux a complete solution was obtained, and heating was maintained for 6 hours. During this time hydrogen sulfide was evolved. At the end of the refluxing period, very little hydrogen sulfide was being evolved and the solution was dark red. The toluene was removed by vacuum distillation. The red solid that remained was dissolved in 165 parts by volume of hot methanol. After cooling, the solid obtained was filtered off and washed with ether yielding a golden solid which had a melting point of 95–98° C. This product was recrystallized from 105 parts by volume of methanol. The yellow solid was washed with ether yielding a purified product having a melting point of 101–102° C.

EXAMPLE 2

*5-acetylimino-4-(m-tolyl)-2-benzylmercapto-$\Delta^2$-1,3,4-thiadiazoline*

The same reaction conditions were used as in Example 1 employing 5 parts of 3-(m-tolyl)benzyldithiocarbazate, 1.7 parts of acetylisothiocyanate and 20 parts by volume of toluene. The reaction mixture was refluxed for only one hour. The product was recrystallized twice from 95% alcohol and washed with hexane to give a product having a melting point of 107–108° C.

EXAMPLE 3

*5-acetylimino-4-(p-bromophenyl)-2-benzylmercapto-$\Delta^2$-1,3,4-thiadiazoline*

The same reaction conditions were used as in Example 1 employing 2.6 parts of 3-(p-bromophenyl)benzyldithiocarbazate, 0.74 part acetylisothiocyanate and 15 parts by volume of toluene. The reaction mixture was refluxed for 5 hours. The product was recrystallized from methanol with charcoal treatment, and was washed with petroleum ether. The product had a melting point of 86–88° C. The sample was recrystallized from methanol again and the purified product had a melting point of 91–92° C.

EXAMPLE 4

*5-acetylimino-4-(p-chlorophenyl)-2-benzylmercapto-$\Delta^2$-1,3,4-thiadiazoline*

The same reaction conditions were used as in Example 1 employing 6.5 parts of 3-(p-chlorophenyl)benzyldithiocarbazate, 2.14 parts of acetylisothiocyanate and 25 parts by volume of toluene. The reaction mixture was refluxed for 3.5 hours. The product was recrystallized twice from 95% alcohol to give a product melting at 84–85° C. A sample was recrystallized from methanol with charcoal treatment yielding a purified product having a melting point of 88–89° C.

The following compounds may be prepared by following the procedure described in Example 1, employing as the starting material the appropriate acyl isothiocyanate and 3-substituted carbazate: 5-formylimino-4-phenyl-2-benzylmercapto-$\Delta^2$-1,3,4-thiadiazoline, 5-propionylimino-4 - (p-iodophenyl) - 2 - benzylmercapto - $\Delta^2$ - 1,3,4-thiadiazoline, 5 - butyrylimino-4-(p-acetamidophenyl)-2-benzylmercapto - $\Delta^2$ - 1,3,4 - thiadiazoline, 5-valyrylimino-4-(m-methoxyphenyl) - 2 - benzylmercapto - $\Delta^2$ - 1,3,4 - thiadiazoline, 5 - phenacetylimino - 4 - (3,4 - dichlorophenyl)-2 - benzylmercapto - $\Delta^2$ - 1,3,4 - thiadiazoline, and 5 - isobutyrylimino - 4 - (p-isopropylphenyl) - 2 - benzylmercapto - $\Delta^2$ - 1,3,4 - thiadiazoline.

We claim:

1. 5 - acylimino - 4 - mononuclear-aryl-substituted-$\Delta^2$-1,3,4-thiadiazoline-2-sulfides of the formula:

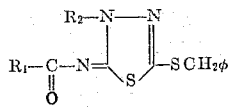

wherein $R_1$ is selected from the group consisting of a hydrogen atom, a lower alkyl radical and a phenyl-lower-alkyl, and $R_2$ is selected from the group consisting of phenyl, halo-substituted phenyl, lower alkyl-substituted phenyl, lower alkoxy-substituted phenyl, amido-substituted phenyl, and nitro-substituted phenyl radicals.

2. 5 - acetylimino-4-phenyl-2-benzylmercapto-$\Delta^2$-1,3,4-thiadiazoline.

3. 5 - acetylimino - 4 - (m-tolyl)-2-benzylmercapto-$\Delta^2$-1,3,4-thiadiazoline.

4. 5-acetylimino-4-(p-bromophenyl)-2-benzylmercapto-$\Delta^2$-1,3,4-thiadiazoline.

5. 5-acetylimino-4-(p-chlorophenyl)-2-benzylmercapto-$\Delta^2$-1,3,4-thiadiazoline.

6. The method of preparing 5-acylimino-4-mononuclear-aryl-substituted-$\Delta^2$-1,3,4-thiadiazoline-2-sulfides of the formula:

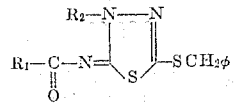

wherein $R_1$ is selected from the group consisting of a hydrogen atom, a lower alkyl radical and a phenyl-lower-alkyl, and $R_2$ is selected from the group consisting of phenyl, halo-substituted phenyl, lower alkyl-substituted phenyl, lower alkoxy-substituted phenyl, amido-substituted phenyl, and nitro-substituted phenyl radicals, which comprises reacting an acyl isothiocyanate with a 3-mononuclear-aryl-substituted-dithiocarbazate in the presence of a non-hydroxylated organic solvent under reflux conditions.

7. The method according to claim 6 in which the isothiocyanate is acetylisothiocyanate.

8. The method of preparing 5-acetylimino-4-phenyl-2-benzylmercapto-$\Delta^2$-1,3,4-thiadiazoline which comprises reacting acetylisothiocyanate with 3-phenylbenzyldithiocarbazate in the presence of toluene under reflux conditions.

9. The method of preparing 5-acetylimino-4-(m-tolyl)-2-benzylmercapto-$\Delta^2$-1,3,4-thiadiazoline which comprises reacting acetylisothiocyanate with 3-(m-tolyl)benzyldithiocarbazate in the presence of toluene under reflux conditions.

10. The method of preparing 5-acetylimino-4-(p-bromophenyl)-2-benzylmercapto - $\Delta^2$ - 1,3,4-thiadiazoline which comprises reacting acetylisothiocyanate with 3-(p-bromophenyl)benzyldithiocarbazate in the presence of toluene under reflux conditions.

11. The method of preparing 5 - acetylimino - 4 - (p-chlorophenyl)-2-benzylmercapto - $\Delta^2$ - 1,3,4-thiadiazoline which comprises reacting acetylisothiocyanate with 3-(p-chlorophenyl)benzyldithiocarbazate in the presence of toluene under reflux conditions.

No references cited.